United States Patent
Okazaki et al.

(10) Patent No.: US 10,430,196 B2
(45) Date of Patent: Oct. 1, 2019

(54) ARITHMETIC PROCESSING DEVICE FOR PREDICTING LOOP PROCESSING

(71) Applicant: FUJITSU LIMITED, Kawasaki-shi, Kanagawa (JP)

(72) Inventors: Ryohei Okazaki, Kawasaki (JP); Norihito Gomyo, Tama (JP); Yasunobu Akizuki, Kawasaki (JP); Takashi Suzuki, Kawasaki (JP)

(73) Assignee: FUJITSU LIMITED, Kawasaki (JP)

(*) Notice: Subject to any disclaimer, the term of this patent is extended or adjusted under 35 U.S.C. 154(b) by 213 days.

(21) Appl. No.: 15/601,086

(22) Filed: May 22, 2017

(65) Prior Publication Data

US 2018/0004528 A1  Jan. 4, 2018

(30) Foreign Application Priority Data

Jun. 30, 2016  (JP) .................................. 2016-130362

(51) Int. Cl.
*G06F 9/38* (2018.01)
*G06F 9/30* (2018.01)
*G06F 9/26* (2006.01)

(52) U.S. Cl.
CPC ............ *G06F 9/3806* (2013.01); *G06F 9/261* (2013.01); *G06F 9/30065* (2013.01); *G06F 9/381* (2013.01); *G06F 9/3844* (2013.01); *G06F 9/3885* (2013.01)

(58) Field of Classification Search
CPC .... G06F 9/381; G06F 9/3806; G06F 9/30065; G06F 9/3844; G06F 9/3885
See application file for complete search history.

(56) References Cited

U.S. PATENT DOCUMENTS

| | | | |
|---|---|---|---|
| 2004/0003202 A1 | 1/2004 | Ukai | |
| 2012/0185714 A1* | 7/2012 | Chung | G06F 1/3203 713/323 |
| 2013/0339700 A1 | 12/2013 | Blasco-Allue et al. | |
| 2015/0227374 A1* | 8/2015 | Blasco | G06F 9/3806 712/240 |

FOREIGN PATENT DOCUMENTS

| | | |
|---|---|---|
| JP | H09-114660 | 5/1997 |
| JP | 2004-038337 | 2/2004 |
| JP | 2014-013565 | 1/2014 |

* cited by examiner

*Primary Examiner* — Jyoti Mehta
(74) *Attorney, Agent, or Firm* — Fujitsu Patent Center

(57) ABSTRACT

An arithmetic processing device includes: a branch prediction unit configured to predict a branch destination address and loop processing based on an address generated by an address generation unit; an instruction buffer unit configured to store an instruction of the address generated by the address generation unit; an instruction decoding unit configured to decode the instruction stored in the instruction buffer unit; and a loop buffer unit configured to store decoding results or decoding intermediate results of instructions of the predicted loop processing that are decoded by the instruction decoding unit and output the stored decoding results or decoding intermediate results a predetermined number of times in response to the loop processing, in which during a period when selecting the output of the loop buffer unit, operations of the address generation unit, the branch prediction unit, the instruction buffer unit, and the instruction decoding unit are stopped.

10 Claims, 11 Drawing Sheets

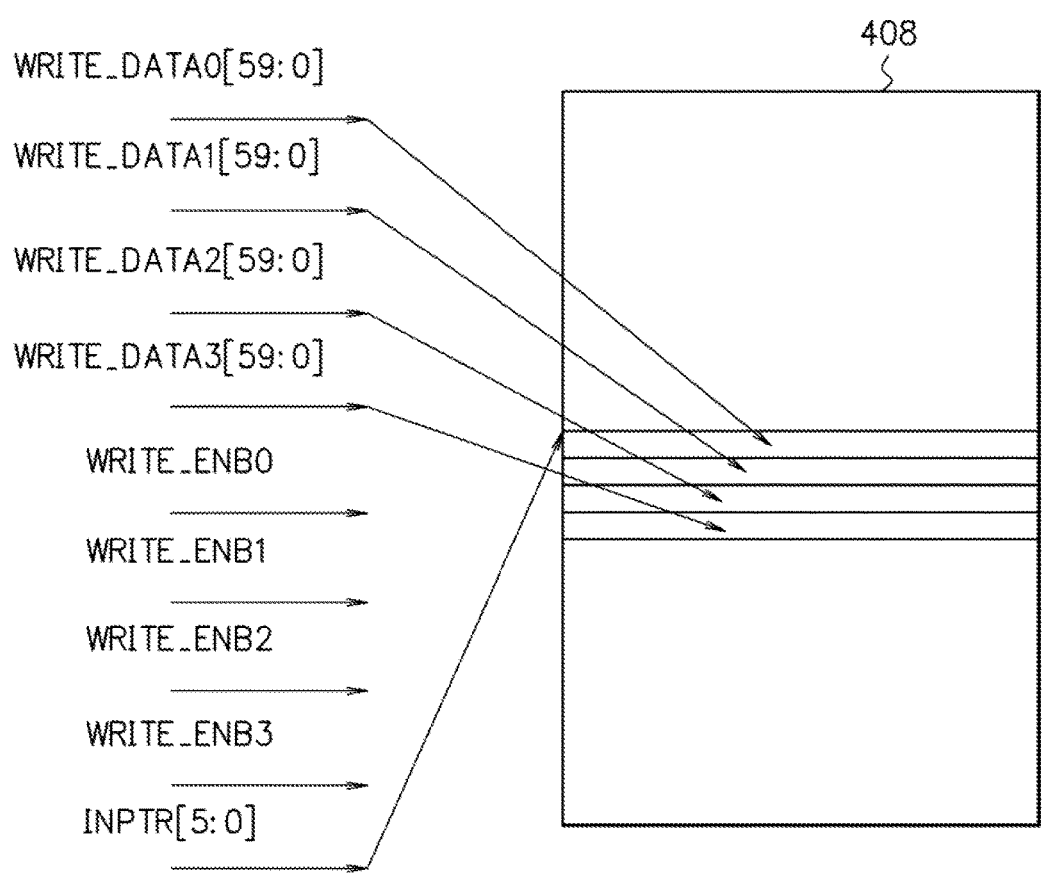
F I G. 5

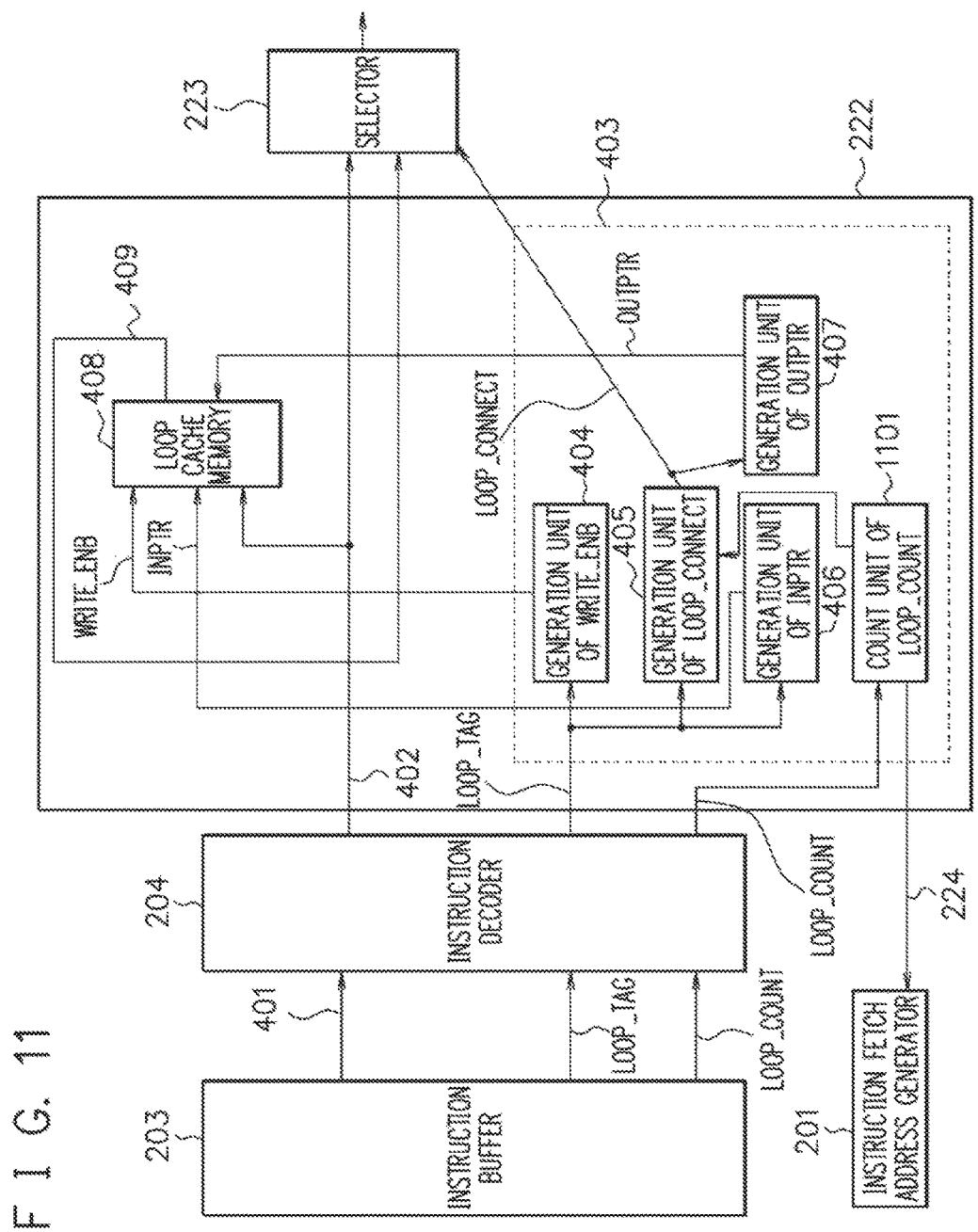

ARITHMETIC PROCESSING DEVICE FOR PREDICTING LOOP PROCESSING

CROSS-REFERENCE TO RELATED APPLICATION

This application is based upon and claims the benefit of priority of the prior Japanese Patent Application No. 2016-130362, filed on Jun. 30, 2016, the entire contents of which are incorporated herein by reference.

FIELD

The embodiments discussed herein are directed to an arithmetic processing device and a control method of an arithmetic processing device.

BACKGROUND

There has been known an apparatus including a loop buffer configured to store instruction operations (see Patent Document 1). The instruction operations are dispatched from the loop buffer responsive to detecting the apparatus is in a loop buffer mode. The apparatus further includes a loop buffer control unit coupled to the loop buffer. The loop buffer control unit tracks a distance from a start of a loop candidate containing a plurality of instructions to each "taken branch" within the loop candidate. Then, the loop buffer control unit initiates the loop buffer mode responsive to detecting distances from the start of the loop candidate to each of the "taken branches" are invariant for at least a given number of iterations of the loop candidate.

Further, there has been known a data processor in which an instruction read out from an instruction storage means is decoded by an instruction decoding means and an instruction executing means is controlled by control information output from the instruction decoding means (see Patent Document 2). A control means causes a control information storage means to hold control information obtainable as a result of decoding a series of instructions that should be executed repeatedly and causes the control information storage means to output the control information repeatedly in response to occurrence of an internal state where the series of instructions equivalent to the number equal to or less than a first upper limit value should be executed repeatedly. Additionally, the control means actually stops operations of the instruction storage means and the instruction decoding means.

Patent Document 1: Japanese Laid-open Patent Publication No. 2014-13565
Patent Document 2: Japanese Laid-open Patent Publication No. 09-114660

Patent Document 1 initiates the loop buffer mode responsive to detecting distances from the start of the loop candidate to each of the "taken branches" are invariant for at least a given number of iterations of the loop candidate. Patent Document 2 causes the control information storage means to hold the control information obtainable as a result of decoding a series of instructions that should be executed repeatedly and causes the control information storage means to output the control information repeatedly in response to occurrence of an internal state where the series of instructions equivalent to the number equal to or less than the first upper limit value should be executed repeatedly. Patent Documents 1 and 2 are to judge loop processing based on control information obtainable as a result of decoding instructions.

SUMMARY

An arithmetic processing device includes: an address generation unit configured to generate an address for fetching an instruction; a branch prediction unit configured to predict a branch destination address of a branch instruction based on the address generated by the address generation unit, output the predicted branch destination address to the address generation unit, and predict loop processing based on the address generated by the address generation unit; an instruction buffer unit configured to store an instruction corresponding to the address generated by the address generation unit; a first instruction decoding unit configured to decode the instruction stored in the instruction buffer unit; a loop buffer unit configured to store decoding results or decoding intermediate results of instructions of the predicted loop processing that are decoded by the first instruction decoding unit and output the stored decoding results or decoding intermediate results a predetermined number of times in response to the loop processing; and a selection unit configured to select either output of the loop buffer unit or output of the first instruction decoding unit, in which during a period when the selection unit selects the output of the loop buffer unit, the loop buffer unit stops operations of the address generation unit, the branch prediction unit, the instruction buffer unit, and the first instruction decoding unit.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 5 is a view illustrating a write operation into a loop cache memory;

FIG. 11 is a diagram illustrating a configuration example of an arithmetic processing device according to a fourth embodiment.

DESCRIPTION OF EMBODIMENTS (First Embodiment)

Figure 1:
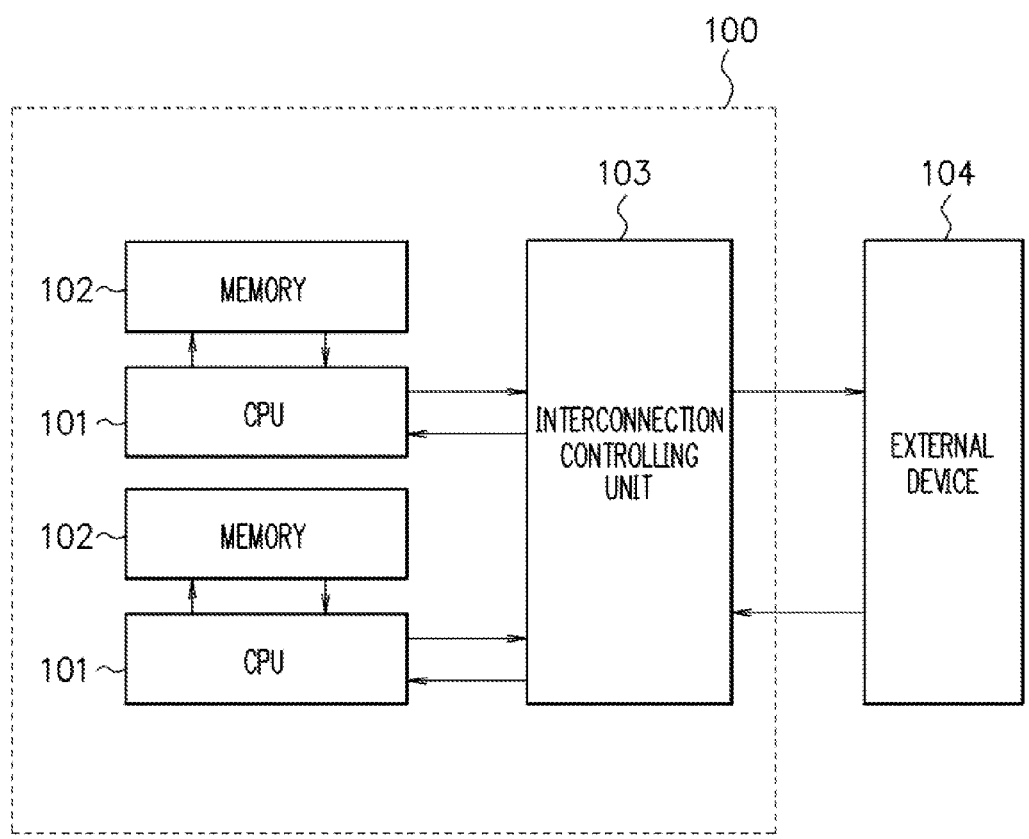
FIG. 1 is a diagram illustrating a configuration example of an information processing device according to a first embodiment.

FIG. 1 is a diagram illustrating a configuration example of an information processing device 100 according to a first embodiment. The information processing device 100 is, for example, a server, and includes a plurality of arithmetic processing devices 101, a plurality of memories 102, and an interconnection controlling unit 103. The arithmetic processing devices 101 are, for example, a central processing unit (CPU) or a processor, and are connected to the interconnection controlling unit 103. The plural memories 102 are connected to the plural arithmetic processing devices 101, respectively. The interconnection controlling unit 103 performs input/output controls on an external device 104.

Figure 2:
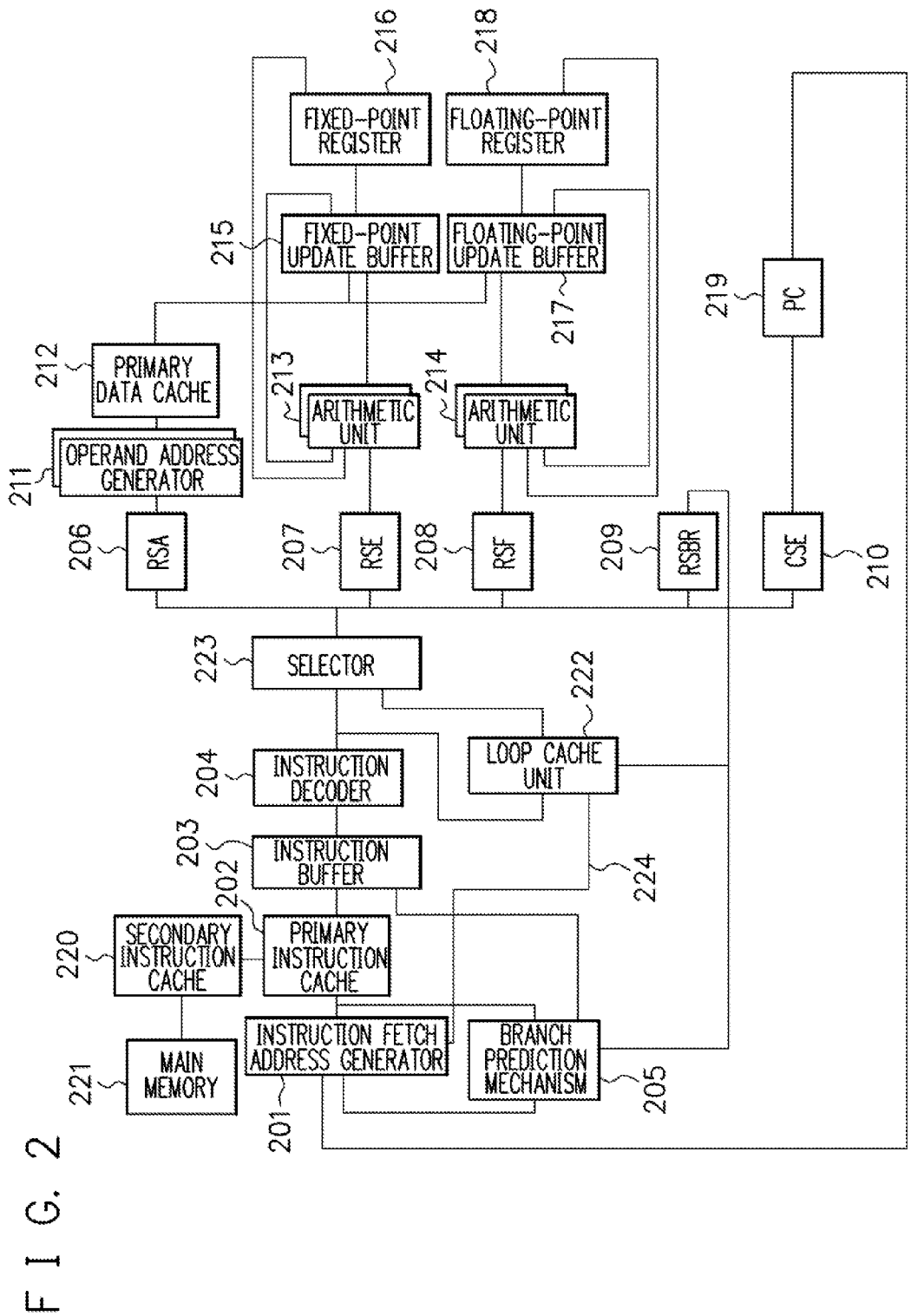
FIG. 2 is a diagram illustrating a configuration example of an arithmetic processing device.

FIG. 2 is a diagram illustrating a configuration example of the information processing device 101 in FIG. 1. The information processing device 101 is, for example, a superscalar processor. An instruction fetch address generator 201, in order to generate an address for fetching an instruction, selects an instruction address received from a program counter (PC) 219 or a branch prediction mechanism 205 and outputs an instruction fetch request of the selected instruction address to a primary instruction cache memory 202. The branch prediction mechanism 205 is a branch prediction unit, and predicts whether or not a branch instruction branches based on the address generated by the instruction fetch address generator 201 and when predicting that the branch instruction branches, outputs a branch destination address to the instruction fetch address generator 201. Further, the branch prediction mechanism 205 predicts loop processing based on the address generated by the instruction fetch address generator 201, and when predicting the loop processing, outputs a loop processing tag LOOP_TAG to an instruction buffer 203. The primary instruction cache memory 202 outputs an instruction according to the instruction fetch request of the instruction address to the instruction buffer 203. Further, when not having the instruction stored therein, the primary instruction cache memory 202 outputs the instruction stored in a secondary instruction cache memory 220 or a main memory 221 to the instruction buffer 203. The instruction buffer 203 buffers the instruction and supplies the resultant instruction to an instruction decoder 204 in the order of a program. Incidentally, when receiving the loop processing tag LOOP_TAG from the branch prediction mechanism 205, the instruction buffer 203 attaches the loop processing tag LOOP_TAG to the instruction to buffer the instruction, and supplies the resultant instruction and the loop processing tag LOOP_TAG to the instruction decoder 204. The instruction decoder 204 is a first instruction decoder, and decodes the instruction stored in the instruction buffer 203 in the order of a program and outputs a decoding result and the loop processing tag LOOP_TAG.

A loop cache unit 222 is a loop buffer unit, and when receiving the instruction with the loop processing tag LOOP_TAG attached thereto, stores the result of the instruction decoded by the instruction decoder 204 and repeatedly outputs the stored result to a selector 223 in the order of instruction issuance of the loop processing. The selector 223 selects either output of the loop cache unit 222 or output of the instruction decoder 204. Specifically, when the loop processing is predicted, the selector 223 selects the output of the loop cache unit 222 to output it, and when the loop processing is not predicted, the selector 223 selects the output of the instruction decoder 204 to output it.

The instruction fetch address generator 201, the branch prediction mechanism 205, the primary instruction cache memory 202, the instruction buffer 203, and the instruction decoder 204 each stop operating in response to a control signal 224 of the loop cache unit 222 during a period when the selector 223 selects the output of the loop cache unit 222. The instruction fetch address generator 201, the branch prediction mechanism 205, the primary instruction cache memory 202, the instruction buffer 203, and the instruction decoder 204 stop operating because supply of a clock signal is stopped, resulting in that it is possible to reduce power consumption.

The selector 223, in accordance with the type of the instruction, outputs the decoding result to a reservation station for main storage operand address generation (RSA: Reservation Station for Address generate) 206 that controls instruction execution, a reservation station for fixed-point arithmetic (RSE: Reservation Station for Execute) 207, a reservation station for floating-point arithmetic (RSF: Reservation Station for Floating) 208, and a reservation station for branch instruction (RSBR: Reservation Station for BRanch) 209 to create entries. Further, the selector 223 outputs all the decoded instructions to a commit stack entry (CSE: Commit Stack Entry) 210 that controls instruction completion together with instruction identifiers assigned in the order of the instructions to create entries. The CSE 210 includes a storage in a queue structure that stores the decoded instructions in the execution order of the instructions and a completion processing circuit that executes completion processing based on queue information and completion reports from respective processing pipes. The decoded instruction is stored in a queue of the CSE 210 and waits for an instruction processing completion report.

When the entries are created in the RSA 206, the RSE 207, and the RSF 208 with respect to the decoded instruction, an out-of-order execution can be performed by performing renaming corresponding to a fixed-point update buffer 215 and a floating-point update buffer 217. A completion report of the instruction executed out-of-order in the respective reservation stations 206 to 209 is output to the CSE 210. The completion processing circuit of the CSE 210 sequentially completes the instruction corresponding to the completion report out of the instructions waiting for a completion report that are stored in the queue in accordance with the original execution order of a program and updates resources.

A plurality of operand address generators 211 generate an operand address in accordance with the entry of the RSA 206 to output the operand address to a primary data cache memory 212. The primary data cache memory 212 outputs data of the generated operand address to the fixed-point register 215 or the floating-point register 217. A plurality of arithmetic units 213 perform fixed-point arithmetic in accordance with the entry of the RSE 207, and store an execution result of the arithmetic in the fixed-point update buffer 215. A plurality of arithmetic units 214 perform floating-point arithmetic in accordance with the entry of the RSF 208 and store an execution result of the arithmetic in the floating-point register 217. The instruction executed out-of-order in the reservation stations 206 to 209 is subjected to completion processing in the order of a program by the control of the CSE 210, and programmable resources such as the fixed-point register 216, the floating-point register 218, and the program counter 219 are updated with respect only to the completed instruction. The program counter 219 outputs an address of currently executed instruction. The branch prediction mechanism 205 predicts whether or not a branch instruction branches in response to a branch instruction completion report of the RSBR 209, and outputs an address of an instruction to be executed next to the instruction fetch address generator 201.

Figure 3:
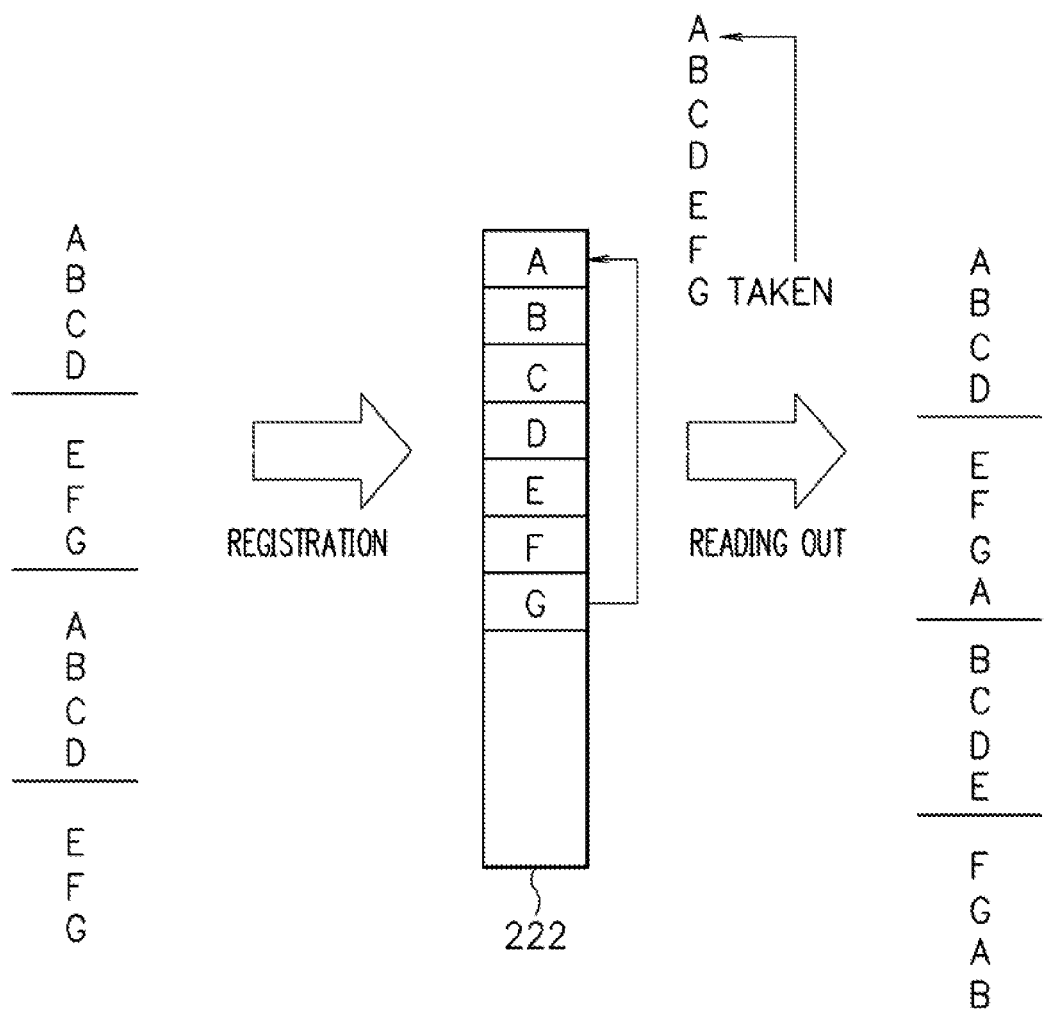
FIG. 3 is a view illustrating registration and reading-out of a loop cache unit.

FIG. 3 is a view illustrating registration and reading-out of the loop cache unit 222. The loop processing includes instructions A, B, C, D, E, F, and G in the address order. The instruction G is a branch instruction. When a branch condition is satisfied, the branch instruction G branches to proceed to the instruction A at a branch destination address smaller than an address of the branch instruction G. In this case, the arithmetic processing device 101 performs the loop processing that repeats the instructions A, B, C, D, E, F, and G. The loop processing is processing to repeat the instructions A, B, C, D, E, F, and G. Further, when the branch condition is not satisfied, the branch instruction G does not branch to proceed to an instruction at an address following the branch instruction G. The loop cache unit 222 receives four instructions at the maximum in parallel from the instruction decoder 204. However, in the loop cache unit 222, due to branch prediction of the branch instruction G, simultaneous parallel input of instructions intermits at the instruction G. Therefore, the loop cache unit 222 receives the four instructions A, B, C, and D in parallel in a first input cycle, receives the three instructions E, F, and G in parallel in a second input cycle, receives the four instructions A, B, C, and D in parallel in a third input cycle, and receives the three instructions E, F, and G in a fourth input cycle.

The loop cache unit 222 stores (registers) the decoded instructions A to G. The loop cache unit 222 stores the decoded instructions A to G closely in the order in which they are supplied. After the branch prediction mechanism 205 predicts the loop processing, the loop cache unit 222 outputs the decoded instructions A to G to the selector 223 in the order in which they are stored in the loop cache unit 222, and returning to the instruction A at the branch destination address after the branch instruction G, outputs the decoded instructions A to G to the selector 223 repeatedly. Therefore, the loop cache unit 222 can closely store the instruction A after the branch instruction G to output the instructions simultaneously in parallel to the selector 223. Thereby, the loop cache unit 222 outputs the four instructions A, B, C, and D in parallel in a first output cycle, outputs the four instructions E, F, G, and A in parallel in a second output cycle, outputs the four instructions B, C, D, and E in parallel in a third output cycle, and outputs the four instructions F, G, A, and B in parallel in a fourth output cycle. Therefore, in the loop cache unit 222, the number of parallel outputs per one cycle is larger than the number of parallel inputs per one cycle. Providing the loop cache unit 222 enables an increase in the number of instructions executable per one cycle and speeding up of the processing.

Figure 4:
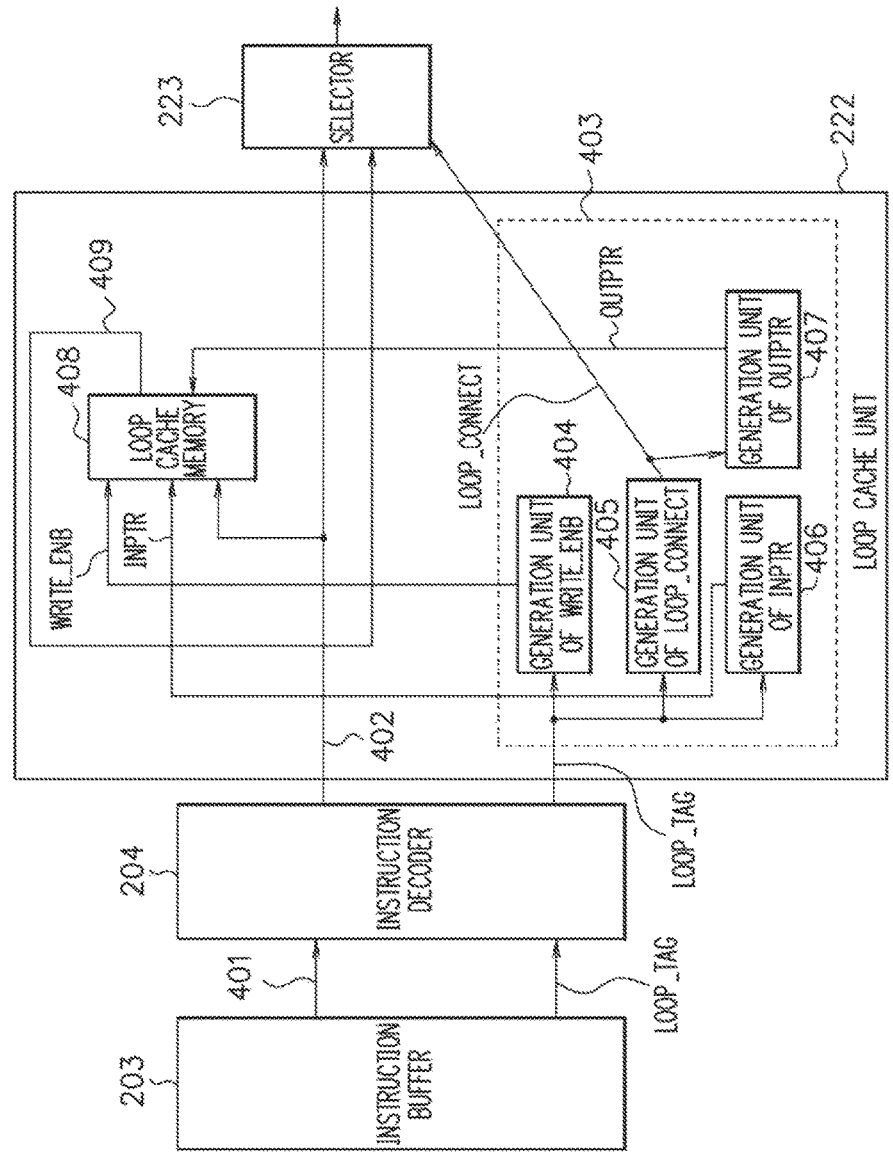
FIG. 4 is a diagram illustrating a configuration example of the loop cache unit.

FIG. 4 is a diagram illustrating a configuration example of the loop cache unit 222. The loop cache unit 222 includes a loop cache control unit 403 and a loop cache memory 408. The loop cache control unit 403 includes generation units 404 to 407.

The instruction fetch address generator 201 outputs an address for fetching an instruction to the primary instruction cache memory 202 and the branch prediction mechanism 205. The branch prediction mechanism 205 performs branch prediction on an instruction of the address output by the instruction fetch address generator 201 based on an execution completion report of the branch instruction G and a branch result of the completed branch instruction G from the RSBR 209, and when predicting that the instruction branches, outputs a branch destination address to the instruction fetch address generator 201.

Simultaneously, the branch prediction mechanism 205 predicts whether or not the instruction of the address output by the instruction fetch address generator 201 is the branch instruction G constituting the loop processing based on the execution completion report of the branch instruction G and the branch result of the completed branch instruction G. The branch prediction mechanism 205, for example, stores the address of the loopback branch instruction G to branch to the branch destination address smaller than the address of the branch instruction G and when receiving an execution completion report indicating that the branch instruction G of the address branches to the branch destination address a number of times equal to or more than a threshold count, predicts the loop processing. That is, the branch prediction mechanism 205, when receiving an execution completion report indicating that the loop processing of a loop count equal to or more than the threshold count has been performed by an execution unit after the reservation stations 206 to 209 from the RSBR 209, predicts future loop processing to output the loop processing tag LOOP_TAG intended to be attached to the branch instruction G to the instruction buffer 203. At this time, the branch prediction mechanism 205 outputs the loop processing tag LOOP_TAG to the instruction buffer 203 in conformity with the timing at which the instruction buffer 203 receives the branch instruction G.

The instruction buffer 203, when receiving the loop processing tag LOOP_TAG from the branch prediction mechanism 205, attaches the loop processing tag LOOP_TAG to the branch instruction received from the primary instruction cache memory 202 and buffers the resultant branch instruction to output a branch instruction 401 and the loop processing tag LOOP_TAG to the instruction decoder 204. Further, the instruction buffer 203, when not receiving the loop processing tag LOOP_TAG from the branch prediction mechanism 205, buffers the instruction received from the primary instruction cache memory 202 without attaching the loop processing tag LOOP_TAG thereto and outputs the instruction 401 to the instruction decoder 204. The instruction decoder 204 decodes the instruction 401 to thereby create a decoding result 402. Then, the instruction decoder 204, when receiving the loop processing tag LOOP_TAG, outputs the decoding result 402 and the loop processing tag LOOP_TAG, and when not receiving the loop processing tag LOOP_TAG, outputs the decoding result 402.

The generation unit 404 outputs a write enable signal WRITE_ENB to the loop cache memory 408 based on the loop processing tag LOOP_TAG. The generation unit 405 outputs a loop connect signal LOOP_CONNECT to the selector 223 and the generation unit 407 based on the loop processing tag LOOP_TAG. The generation unit 406 outputs a write pointer INPTR to the loop cache memory 408 based on the loop processing tag LOOP_TAG. The generation unit 407 outputs a read pointer OUTPTR to the loop cache memory 408 based on the loop connect signal LOOP_CONNECT.

When the loop processing tag LOOP_TAG is input, instructions constituting one loop are instructions ranging from the instruction A following the instruction G having the loop processing tag LOOP_TAG attached thereto to the coming instruction G having the loop processing tag LOOP_TAG attached thereto. Therefore, the generation unit 404, when receiving the loop processing tag LOOP_TAG, turns the write enable signal WRITE_ENB into an enable state in order to start writing from the following instruction A. The loop cache memory 408, when the write enable signal WRITE_ENB is turned into an enable state, writes the decoding result 402 output by the instruction decoder 204 into an address indicated by the write pointer INPTR. When the write enable signal WRITE_ENB is in an enable state, the generation unit 406 increments the write pointer INPTR and the loop cache memory 408 performs writing of the following decoding result 402. The generation unit 404, when receiving the loop processing tag LOOP_TAG again, turns the write enable signal WRITE_ENB into a disable state in order to complete writing of up to the instruction G. The loop cache memory 408, when the write enable signal WRITE_ENB is turned into a disable state, completes writing of the decoding result 402. Thereby, the decoding results 402 of the instructions A to G constituting one loop are written into the loop cache memory 408.

Next, the generation unit 405, when a loop connect condition is satisfied, turns the loop connect signal LOOP_CONNECT into an activated state. The loop connect condition is, for example, a condition such that the instructions A to G for one loop are normally written into the loop cache memory 408 without overflowing and a jump address of branch prediction of the branch instruction G matches the address of the instruction A.

The generation unit 407, when the loop connect signal LOOP_CONNECT turns into an activated state, updates the read pointer OUTPTR. The loop cache memory 408 reads out a decoding result 409 from an address indicated by the read pointer OUTPTR to output it to the selector 223. During the period when the loop connect signal LOOP_CONNECT is in an activated state, the generation unit 407 updates the read pointer OUTPTR and the loop cache memory 408 repeatedly outputs the decoding results 409 of the instructions A to G for the loop processing.

The selector 223, when the loop connect signal LOOP_CONNECT is in an activated state, selects the decoding results 409 output by the loop cache memory 408 to output them. Further, the selector 223, when the loop connect signal LOOP_CONNECT is in an inactivated state, selects the decoding result 402 output by the instruction decoder 204 to output it.

During the period when the loop connect signal LOOP_CONNECT is in an activated state, the loop cache unit 222 stops supplying a clock signal to the instruction fetch address generator 201, the branch prediction mechanism 205, the primary instruction cache memory 202, the instruction buffer 203, and the instruction decoder 204 to thereby stop their operations, resulting in a reduction in power consumption.

The loop cache unit 222, when receiving an execution completion report indicating that the prediction of the loop processing by the branch prediction mechanism 205 failed and the branch instruction G did not branch to the branch destination address from the RSBR 209, starts the operations of the instruction fetch address generator 201, the branch prediction mechanism 205, the primary instruction cache memory 202, the instruction buffer 203, and the instruction decoder 204. Further, in this case, the generation unit 405 turns the loop connect signal LOOP_CONNECT into an inactivated state, and the selector 223 selects the decoding result 402 output by the instruction decoder 204 to output it.

FIG. 5 is a view illustrating a write operation into the loop cache memory 408. The loop cache memory 408 receives four pieces of 60-bit write data WRITE_DATA0 [59:0], WRITE_DATA1 [59:0], WRITE_DATA2 [59:0],and WRITE_DATA3 [59:0] in parallel from the instruction decoder 204 every cycle. Four pieces of the write data WRITE_DATA0 [59:0] to WRITE_DATA3 [59:0] correspond to the decoding result 402 in FIG. 4, and correspond to the decoding results 402 of the four instructions A to D in FIG. 3, for example. A 6-bit write pointer INPTR [5:0] corresponds to the write pointer INPTR in FIG. 4.

Four write enable signals WRITE_ENB0 to WRITE_ENB3 correspond to the write enable signal WRITE_ENB in FIG. 4. The case when the write enable signal WRITE_ENB0 is in an enable state indicates that the write data WRITE_DATA0 [59:0] is valid, and the write data WRITE_DATA0 [59:0] is written into the loop cache memory 408. In contrast to this, the case when the write enable signal WRITE_ENB0 is in a disable state indicates that the write data WRITE_DATA0 [59:0] is invalid, and the write data WRITE_DATA0 [59:0] is not written into the loop cache memory 408.

Similarly, the case when the write enable signal WRITE_ENB1 is in an enable state indicates that the write data WRITE_DATA1 [59:0] is valid, and the write data WRITE_DATA1 [59:0] is written into the loop cache memory 408. In contrast to this, the case when the write enable signal WRITE_ENB1 is in a disable state indicates that the write data WRITE_DATA1 [59:0] is invalid, and the write data WRITE_DATA1 [59:0] is not written into the loop cache memory 408.

Similarly, the case when the write enable signal WRITE_ENB2 is in an enable state indicates that the write data WRITE_DATA2 [59:0] is valid, and the write data WRITE_DATA2 [59:0] is written into the loop cache memory 408. In contrast to this, the case when the write enable signal WRITE_ENB2 is in a disable state indicates that the write data WRITE_DATA2 [59:0] is invalid, and the write data WRITE_DATA2 [59:0] is not written into the loop cache memory 408.

Similarly, the case when the write enable signal WRITE_ENB3 is in an enable state indicates that the write data WRITE_DATA3 [59:0] is valid, and the write data WRITE_DATA3 [59:0] is written into the loop cache memory 408. In contrast to this, the case when the write enable signal WRITE_ENB3 is in a disable state indicates that the write data WRITE_DATA3 [59:0] is invalid, and the write data WRITE_DATA3 [59:0] is not written into the loop cache memory 408.

In FIG. 3, for example, in the third input cycle, four pieces of the write data WRITE_DATA0 [59:0] to write data WRITE_DATA3 [59:0] are the decoding results 402 of the four instructions A to D, and are input to the loop cache memory 408 in parallel. On this occasion, the four write enable signals WRITE_ENB0 to WRITE_ENB3 all turn into an enable state. The loop cache memory 408, in the third input cycle, writes four pieces of the write data WRITE_DATA0 [59:0] to WRITE_DATA3 [59:0] in order into the addresses indicated by the write pointer INPTR [5:0].

Next, in FIG. 3, in the fourth input cycle, three pieces of the write data WRITE_DATA0 [59:0] to WRITE_DATA2 [59:0] are the decoding results 402 of the three instructions E to G, and are input to the loop cache memory 408 in parallel. On this occasion, the write enable signals WRITE_ENB0 to WRITE_ENB2 turn into an enable state, and the write enable signal WRITE_ENB3 turns into a disable state. The loop cache memory 408, in the fourth input cycle, writes three pieces of the write data WRITE_DATA0 [59:0] to WRITE_DATA2 [59:0] in order into the addresses indicated by the write pointer INPTR [5:0].

The loop cache memory 408 can store decoding results of 60 instructions at the maximum. The write data WRITE_DATA0 [59:0] to WRITE_DATA3 [59:0] are each written into the loop cache memory 408 when the write enable signals WRITE_ENB0 to WRITE_ENB3 are in an enable state. The loop cache memory 408 performs writing only a number of times equivalent to the number of valid write data from the addresses indicated by the write pointer INPTR [5:0]. The loop cache memory 408 writes only the valid write data, and the generation unit 406 increments the write pointer INPTR [5:0] by the number of written valid write data. The generation unit 406, when receiving the loop processing tag LOOP_TAG, clears the write pointer INPTR [5:0] to an address 0. The loop cache memory 408 writes the decoding result from the address at the address 0 indicated by the write pointer INPTR [5:0]. The decoding results of the instructions A to G for one loop are written into the loop cache memory 408.

Figure 6:
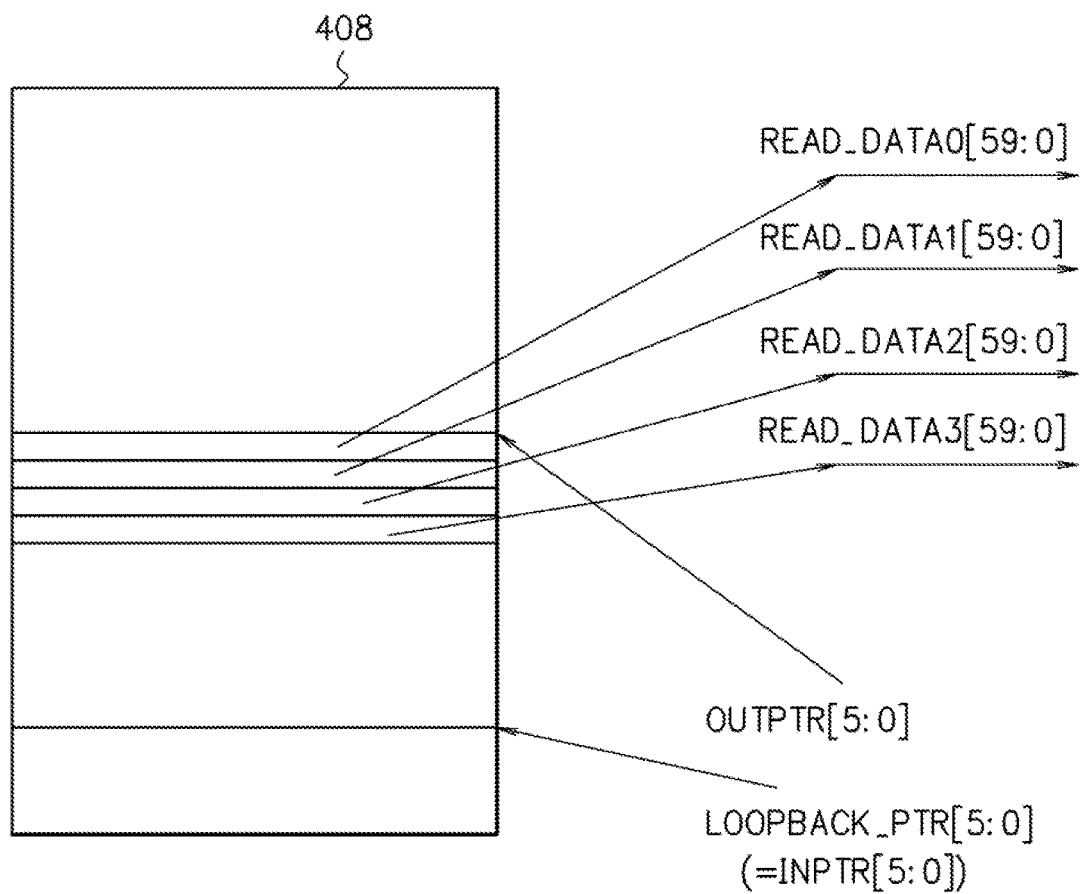
FIG. 6 is a view illustrating a read-out operation from the loop cache memory.

FIG. 6 is a view illustrating a read-out operation of the loop cache memory 408, and illustrates an example of reading out instructions of four continuous addresses. A loopback pointer LOOPBACK_PTR [5:0] is an address following the address where the decoding result of the final instruction G out of the instructions A to G for one loop is written, and is the same as the address indicated by the write pointer INPTR [5:0]. The generation unit 407, when receiving the loop connect signal LOOP_CONNECT, clears the read pointer OUTPTR [5:0] to the address 0. The loop cache memory 408 reads out four pieces of continuous 60-bit read data READ_DATA0 [59:0] to READ_DATA3 [59:0] from the addresses indicated by the read pointer OUTPTR [5:0]. The read data READ_DATA0 [59:0] to READ_DATA3 [59:0] correspond to the decoding results 409 in FIG. 4. The generation unit 407 increments the read pointer OUTPTR [5:0] every reading out.

Figure 7:
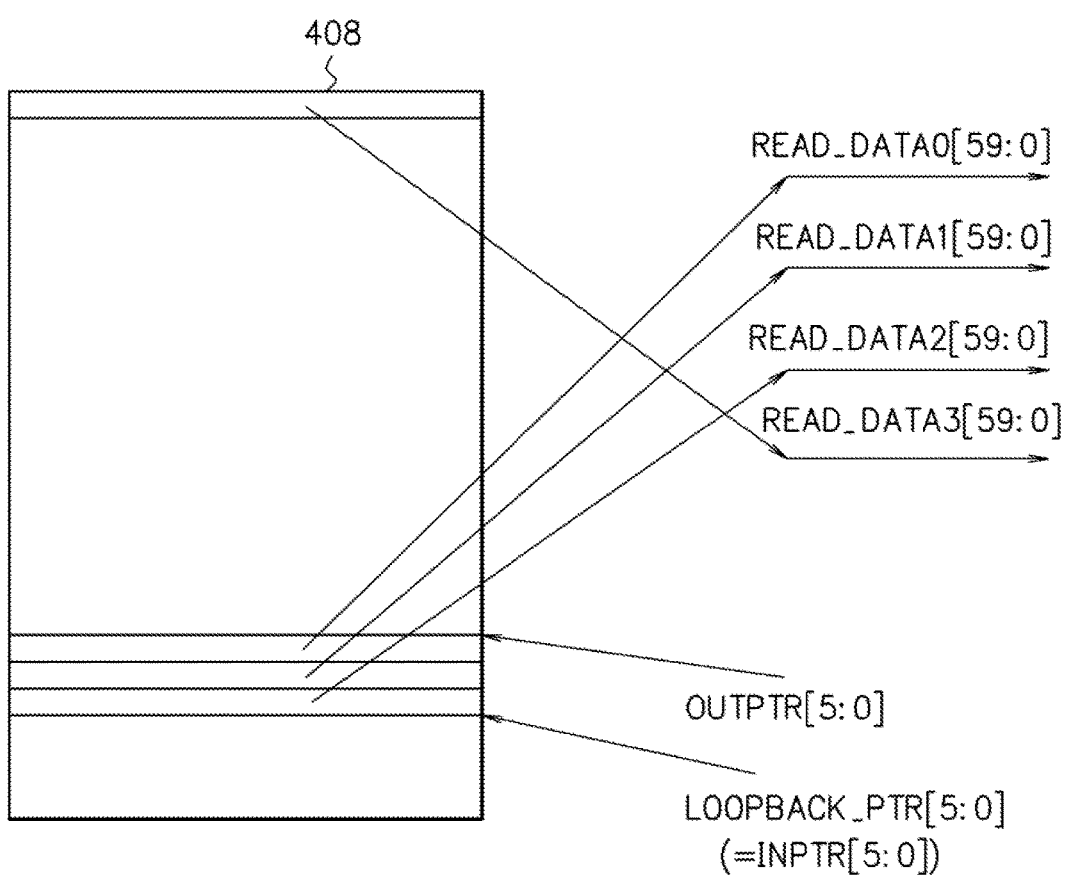
FIG. 7 is a view illustrating another read-out operation from the loop cache memory.

FIG. 7 is a view illustrating a read-out operation of the loop cache memory 408, and illustrates an example of reading out instructions of four discontinuous addresses. The loop cache memory 408 reads out four pieces of the read data READ_DATA0 [59:0] to READ_DATA3 [59:0] from the addresses indicated by the read pointer OUTPTR [5:0]. For example, the read data READ_DATA0 [59:0] to READ_DATA2 [59:0] correspond to the decoding results of the instructions E to G, and the read data READ_DATA3 [59:0] corresponds to the decoding result of the instruction A. The generation unit 407 increments the read pointer OUTPTR [5:0] every time the loop cache memory 408 reads out each of three pieces of the read data READ_DATA0 [59:0] to READ_DATA2 [59:0]. Then, when the read pointer OUTPTR [5:0] becomes the same as the loopback pointer LOOPBACK_PTR [5:0], the generation unit 407 clears the read pointer OUTPTR [5:0] to the address 0. At the address 0 of the loop cache memory 408, the decoding result of the instruction A is stored. Thereby, the loop cache memory 408 can read out the four instructions E, F, G, and A for one cycle.

Figure 8:
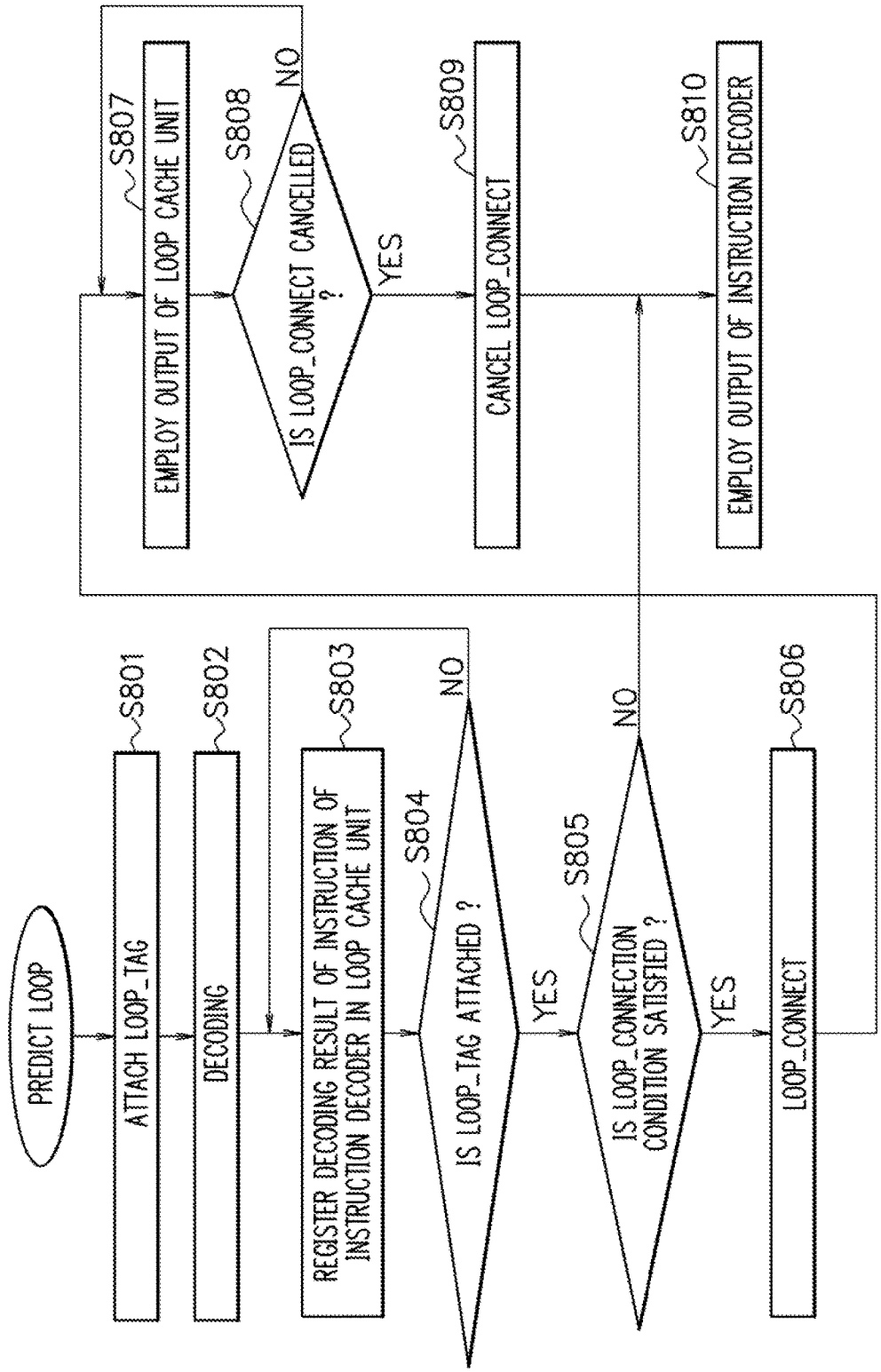
FIG. 8 is a flowchart illustrating a control method of the arithmetic processing device.

FIG. 8 is a flowchart illustrating a control method of the arithmetic processing device 101. At Step S801, the branch prediction mechanism 205, when predicting loop processing, outputs the loop processing tag LOOP_TAG intended to be attached to a branch instruction to the instruction buffer 203. The instruction buffer 203 attaches the loop processing tag LOOP_TAG to the branch instruction to buffer the branch instruction. Then, at Step S802, the instruction decoder 204 decodes the instruction output by the instruction buffer 203 to output a decoding result and the loop processing tag LOOP_TAG.

Then, at Step S803, the loop cache unit 222, when receiving the decoding result with the loop processing tag LOOP_TAG attached thereto, registers (stores) the decoding result output by the instruction decoder 204 in the loop cache memory 408.

Then, at Step S804, the loop cache unit 222 judges whether or not the loop processing tag LOOP_TAG is attached to the following decoding result to be received from the instruction buffer 203. The loop cache unit 222, when judging that the loop processing tag LOOP_TAG is not attached, has not completed registration of the decoding results of the instructions A to G for one loop, and thus returns the processing to Step S803. Further, the loop cache unit 222, when judging that the loop processing tag LOOP_TAG is attached, has completed registration of the decoding results of the instructions A to G for one loop, and thus advances the processing to Step S805.

At Step S805, the generation unit 405 judges whether or not a loop connect condition is satisfied. The loop connect condition is, for example, a condition such that the instructions A to G for one loop are normally written into the loop cache memory 408 without overflowing and a jump address of branch prediction of the branch instruction G matches the address of the instruction A. The generation unit 405, when the loop connect condition is satisfied, turns the loop connect signal LOOP_CONNECT into an activated state, and advances the processing to Step S806. Further, the generation unit 405, when the loop connect condition is not satisfied, turns the loop connect signal LOOP_CONNECT into an inactivated state, and advances the processing to Step S810.

At Step S806, the loop cache unit 222 stops operations of the instruction fetch address generator 201, the branch prediction mechanism 205, the primary instruction cache memory 202, the instruction buffer 203, and the instruction decoder 204 by the control signal 224. This enables a reduction in power consumption.

Then, at Step S807, the selector 223 employs the decoding results output by the loop cache unit 222 to output them. That is, the selector 223, when the loop processing was predicted by the branch prediction mechanism 205 and it becomes clear that the prediction of the loop processing by the branch prediction mechanism 205 was accurate by the loop connect condition, selects the output of the loop cache unit 222.

Then, at Step S808, the generation unit 405 judges whether or not a loop connect cancellation condition is satisfied. The loop connect cancellation condition is, for example, a condition that an execution completion report indicating that the prediction of the loop processing by the branch prediction mechanism 205 failed and the branch instruction G did not branch to the branch destination address is input from the RSBR 209. The case when the loop connect cancellation condition is not satisfied indicates that the prediction of the loop processing was accurate, and the generation unit 405 returns the processing to Step S807 in order to repeatedly output the instructions A to G for one loop. Further, the generation unit 405, when the loop connect cancellation condition is satisfied, completes the loop processing, and advances the processing to Step S809 in order to execute the instruction of the address following the branch instruction G.

At Step S809, the generation unit 405 turns the loop connect signal LOOP_CONNECT into an inactivated state. The loop cache unit 222 starts the operations of the instruction fetch address generator 201, the branch prediction mechanism 205, the primary instruction cache memory 202, the instruction buffer 203, and the instruction decoder 204 by the control signal 224.

Then, at Step S810, the selector 223 employs the decoding result output by the instruction decoder 204 to output it. As above, when it becomes clear that the prediction of the loop processing by the branch prediction mechanism 205 failed by the loop connect cancellation condition, the instruction fetch address generator 201, the branch prediction mechanism 205, the primary instruction cache memory 202, the instruction buffer 203, and the instruction decoder 204 start operating, and the selector 223 selects the output of the instruction decoder 204.

According to this embodiment, when the loop processing is predicted, the selector 223 outputs the decoding results 409 output by the loop cache unit 222 to an instruction execution unit after the reservation stations 206 to 209. During the period when the selector 223 selects the decoding results 409 output by the loop cache unit 222, the instruction fetch address generator 201, the branch prediction mechanism 205, the primary instruction cache memory 202, the instruction buffer 203, and the instruction decoder 204 stop operating, resulting in that it is possible to reduce power consumption.

(Second Embodiment)

Figure 9:
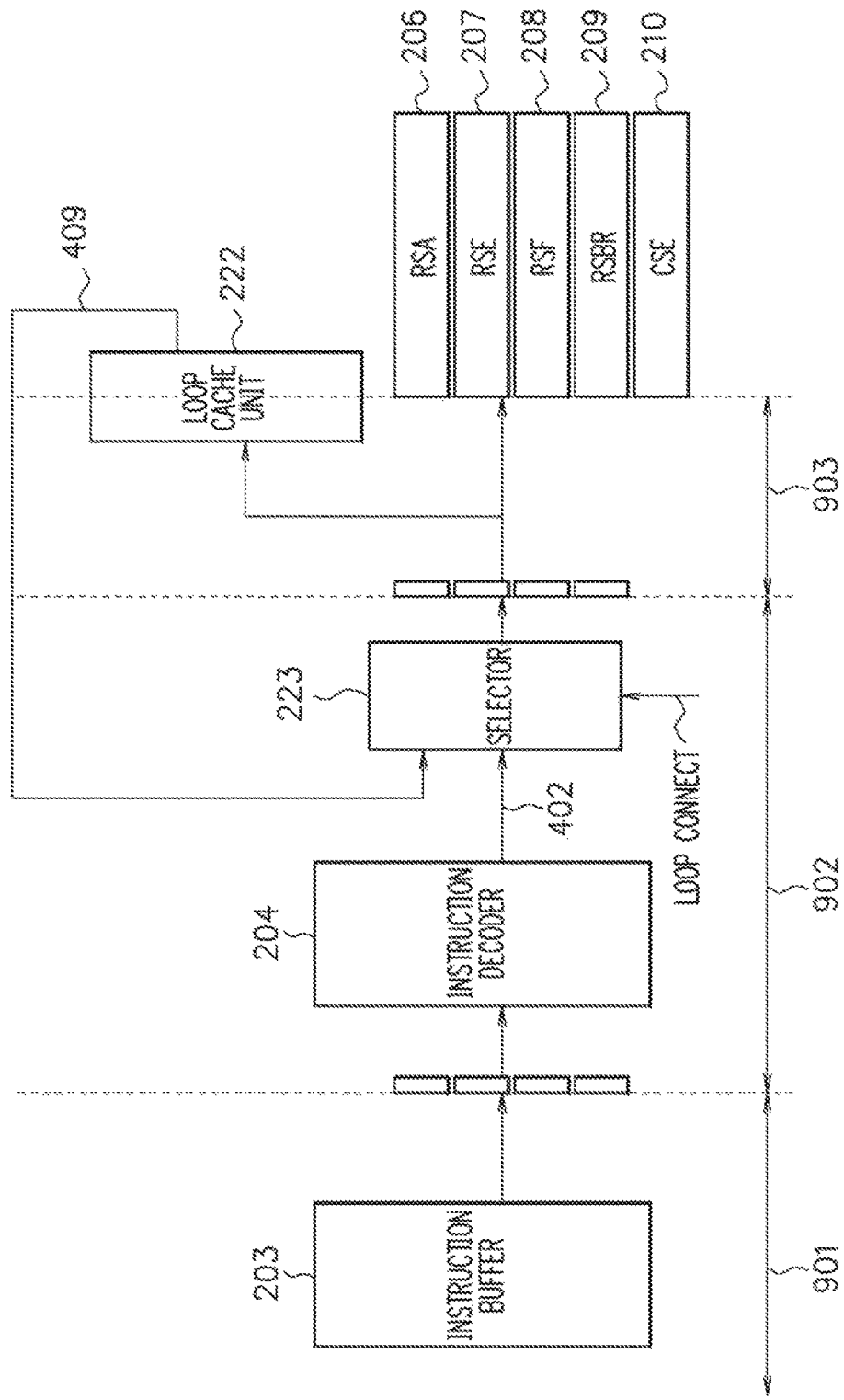
FIG. 9 is a diagram illustrating a configuration example of an arithmetic processing device according to a second embodiment.

FIG. 9 is a diagram illustrating a configuration example of the instruction buffer 203, the instruction decoder 204, the selector 223, and the loop cache unit 222 according to a second embodiment. Hereinafter, differences of this embodiment from the first embodiment will be explained. In the first embodiment, the loop cache unit 222 stores the decoding results output by the instruction decoder 204, but in the second embodiment, the loop cache unit 222 stores decoding results output by the selector 223. An operation of this embodiment is the same as the operation of the first embodiment.

Hereinafter, stages 901 to 903 of a pipeline will be explained. First, at the stage 901, the instruction buffer 203 supplies four instructions (including the loop processing tag LOOP_TAG) to the instruction decoder 204.

Then, at the stage 902, the instruction decoder 204 decodes the instructions to output decoding results 402 to the selector 223. Incidentally, due to instruction set architecture complexity and an improvement in frequency, two or more cycles are taken for the decoding at the stage 902.

Then, at the stage 903, the selector 223, when the loop connect signal LOOP_CONNECT is in an inactivated state, outputs the decoding results 402 output by the instruction decoder 204 to the loop cache unit 222, the RSA 206, the RSE 207, the RSF 208, the RSBR 209, and the CSE 210. Further, the selector 223, when the loop connect signal LOOP_CONNECT is in an activated state, outputs decoding results 409 output by the loop cache unit 222 to the RSA 206, the RSE 207, the RSF 208, the RSBR 209, and the CSE 210.

The loop cache unit 222 receives the decoding results output by the instruction decoder 204 via the selector 223 to write the received decoding results into the loop cache memory 408. Then, the loop cache unit 222 outputs the decoding results 409 read out from the loop cache memory 408 to the selector 223.

(Third Embodiment)

Figure 10:
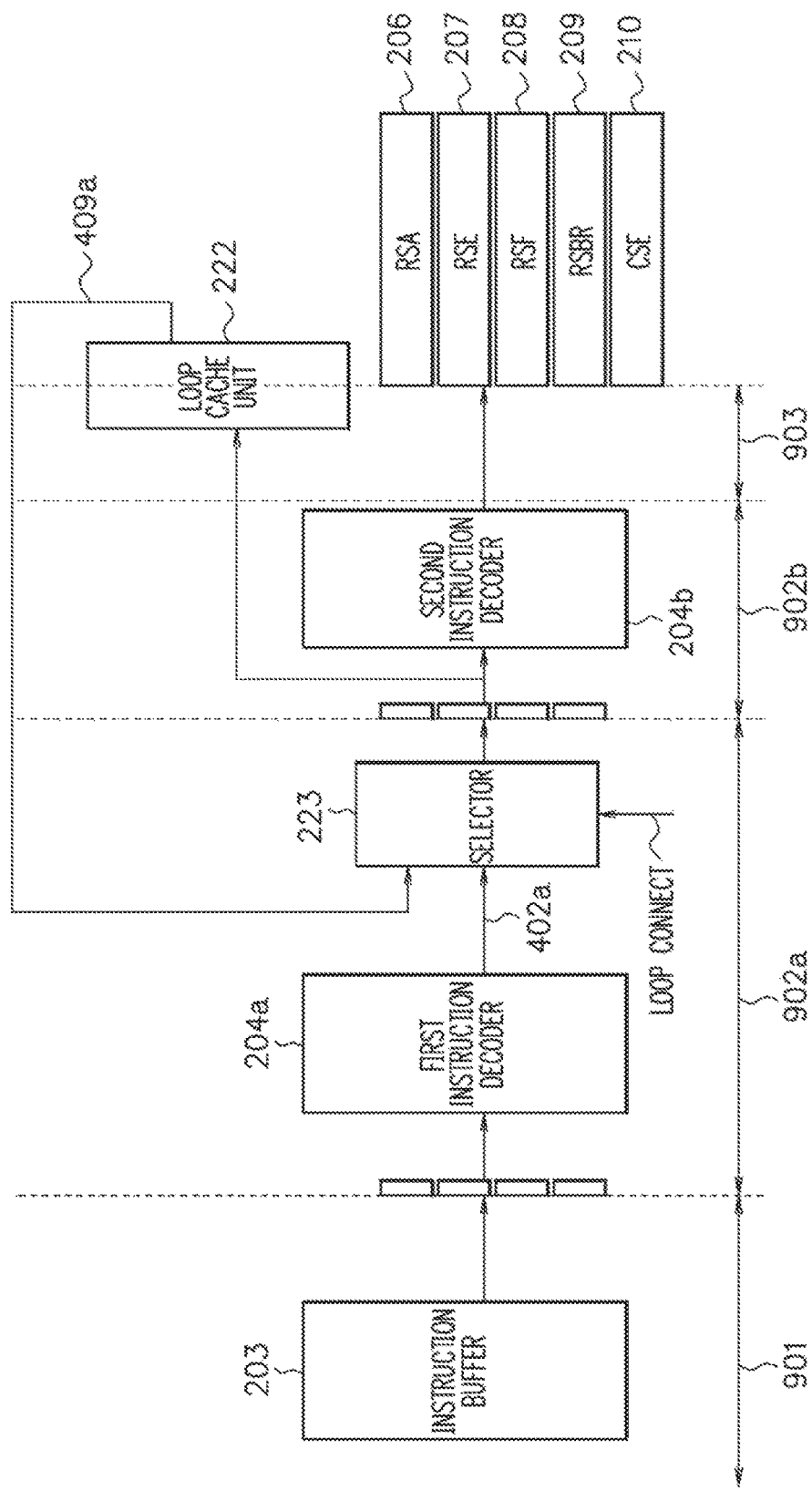
FIG. 10 is a diagram illustrating a configuration example of an arithmetic processing device according to a third embodiment.

FIG. 10 is a diagram illustrating a configuration example of the instruction buffer 203, a first instruction decoder 204a, a second instruction decoder 204b, the selector 223, and the loop cache unit 222 according to a third embodiment. Hereinafter, differences of this embodiment from the first and second embodiments will be explained. In the first and second embodiments, the loop cache unit 222 stores the decoding results of the instruction decoder 204, but in the third embodiment, the loop cache unit 222 stores decoding intermediate results. The first instruction decoder 204a and the second instruction decoder 204b are into which the instruction decoder 204 in FIG. 9 is divided.

In the first and second embodiments, the loop cache unit 222 stores the decoding result of the completely decoded instruction. However, a bit width of a decoding result of a complex instruction is large. Further, the number of cycles taken for decoding is several cycles. In this embodiment, the loop cache unit 222 stores not the decoding result of the completely decoded instruction, but the decoding intermediate result, thereby making it possible to reduce part of power taken for decoding and reduce the bit width of the decoding intermediate result to be stored in the loop cache unit 222. The first instruction decoder 204a performs, out of decodings D1 to Dn of n cycles that are performed by the instruction decoder 204, the decodings D1 to Dk of the front part. Here, 0<k<n is satisfied. The second instruction decoder 204b performs, out of the decodings D1 to Dn of the n cycles that are performed by the instruction decoder 204, the decodings Dk+1 to Dn of the rear part.

At a stage 902a, the first instruction decoder 204a performs the decodings D1 to Dk of the front part on the instructions output by the instruction buffer 203, and outputs decoding intermediate results 402a to the selector 223. The selector 223, when the loop connect signal LOOP_CONNECT is in an inactivated state, outputs the decoding intermediate results 402a output by the first instruction decoder 204a to the loop cache unit 222 and the second instruction decoder 204b. Further, the selector 223, when the loop connect signal LOOP_CONNECT is in an activated state, outputs decoding intermediate results 409a output by the loop cache unit 222 to the second instruction decoder 204b.

Then, at a stage 902b, the second instruction decoder 204b performs the decodings Dk+1 to Dn of the rear part on the decoding intermediate results output by the selector 223 to create final decoding results.

Then, at the stage 903, the second instruction decoder 204b outputs the final decoding results to the RSA 206, the RSE 207, the RSF 208, the RSBR 209, and the CSE 210.

The loop cache unit 222 receives the decoding intermediate results 402a output by the instruction decoder 204 via the selector 223 to write the received decoding intermediate results 402a into the loop cache memory 408. Then, the loop cache unit 222 outputs the decoding intermediate results 409a read out from the loop cache memory 408 to the selector 223.

As above, the loop cache unit 222 stores the intermediate results 402a of the decoded instructions, and outputs the stored intermediate results 409a repeatedly. The second instruction decoder 204b decodes the intermediate results 409a output by the loop cache unit 222.

Incidentally, this embodiment can be applied to the first embodiment. That is, the loop cache unit 222, similarly to the first embodiment, may be configured to directly receive the decoding intermediate results 402a output by the first instruction decoder 204a and store the decoding intermediate results 402a.

(Fourth Embodiment)

FIG. 11 is a diagram illustrating a configuration example of the instruction buffer 203, the instruction decoder 204, the loop cache unit 222, and the selector 223 according to a fourth embodiment. FIG. 11 is that a count unit 1101 is added to FIG. 4. Hereinafter, differences of this embodiment from the first embodiment will be explained.

The branch prediction mechanism 205 registers global history based on a number of execution completion reports indicating whether or not branch was performed in the past. Then, the branch prediction mechanism 205 refers to the global history and predicts highly accurate branch, loop processing, and a loop count of the predicted loop processing. The branch prediction mechanism 205, when predicting the loop processing, outputs the loop processing tag LOOP_TAG to the instruction buffer 203, similarly to the first embodiment. In the case, the branch prediction mechanism 205 outputs a residual loop count LOOP_COUNT of the loop processing to the instruction buffer 203. The instruction buffer 203 attaches the loop processing tag LOOP_TAG and the loop count LOOP_COUNT to an instruction to buffer the instruction, and outputs the instruction 401, the loop processing tag LOOP_TAG, and the loop count LOOP_COUNT to the instruction decoder 204. The instruction decoder 204 decodes the instruction 401 to output the decoding result 402, the loop processing tag LOOP_TAG, and the loop count LOOP_COUNT.

In the first embodiment, the branch prediction mechanism 205 stops operating when the loop connect signal LOOP_CONNECT turns into an activated state. The RSBR 209, when the prediction of the loop processing failed, outputs the execution completion report indicating that the branch instruction does not branch to the branch destination. In the case, the CSE 210 completes the branch instruction, and in a pipeline, clears all the instructions that are in execution speculatively and restarts from an instruction fetch of the following instruction. Therefore, a penalty is large.

In this embodiment, the branch prediction mechanism 205 predicts the residual loop count LOOP_COUNT and propagates the predicted loop count LOOP_COUNT through the pipeline. The count unit 1101 stores the loop count LOOP_COUNT output by the instruction decoder 204, and decrements the loop count LOOP_COUNT every time the instructions A to G for one loop are read out from the loop cache memory 408. Specifically, the count unit 1101 decrements the loop count LOOP_COUNT every time the read pointer OUTPTR [5:0] passes through the loopback pointer LOOPBACK_PTR [5:0]. Then, the count unit 1101, when the loop count LOOP_COUNT becomes smaller than a threshold count, starts operations of the instruction fetch address generator 201, the branch prediction mechanism 205, the primary instruction cache memory 202, the instruction buffer 203, and the instruction decoder 204 by the control signal 224. Thereby, the instruction fetch address generator 201 outputs an address following the branch instruction and the primary instruction cache memory 202 outputs an instruction of the address to the instruction buffer 203 because the branch instruction does not branch. The instruction buffer 203 buffers the instruction, and the instruction decoder 204 decodes the instruction to output the decoding result 402.

The count unit 1101, when the loop count LOOP_COUNT becomes 0, outputs a clear signal to the generation unit 405. The generation unit 405, when receiving the clear signal, turns the loop connect signal LOOP_CONNECT into an inactivated state. Then, the selector 223 selects the decoding result 402 output by the instruction decoder 204 to output it. This makes it possible to prevent a penalty when the loop processing is completed.

The above-described threshold count is a count based on the length of the pipeline of an instruction fetch. The threshold count only needs to be determined so that the instruction decoder 204 can supply the decoding result 402 as soon as the instruction of the pipeline of the instruction fetch reaches the instruction decoder 204 and the loop count LOOP_COUNT becomes zero.

As above, the branch prediction mechanism 205 predicts the loop count LOOP_COUNT of the predicted loop processing. The selector 223, when the loop processing of the predicted loop count LOOP_COUNT is being in execution, selects the output of the loop cache unit 222, and when the loop processing of the predicted loop count LOOP_COUNT is completed, selects the output of the instruction decoder 204. The instruction fetch address generator 201, the branch prediction mechanism 205, the primary instruction cache memory 202, the instruction buffer 203, and the instruction decoder 204 start operating when the loop processing of the predicted loop count LOOP_COUNT is completed. Incidentally, this embodiment can be applied also to the second embodiment and the third embodiment.

It should be noted that the above embodiments merely illustrate concrete examples of implementing the present invention, and the technical scope of the present invention is not to be construed in a restrictive manner by these embodiments. That is, the present invention may be implemented in various forms without departing from the technical spirit or main features thereof.

In one aspect, predicting the loop processing enables a reduction in power consumption.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. An arithmetic processing device comprising:
an address generation unit configured to generate an address for fetching an instruction;
a branch prediction unit configured to predict a branch destination address of a branch instruction based on the address generated by the address generation unit, output the predicted branch destination address to the address generation unit, and predict loop processing based on the address generated by the address generation unit;
an instruction buffer unit configured to store an instruction corresponding to the address generated by the address generation unit;
a first instruction decoding unit configured to decode the instruction stored in the instruction buffer unit;
a loop buffer unit configured to store decoding results or decoding intermediate results of instructions of the predicted loop processing that are decoded by the first instruction decoding unit and output the stored decoding results or decoding intermediate results a predetermined number of times in response to the predicted loop processing; and
a selection unit configured to select either output of the loop buffer unit or output of the first instruction decoding unit, wherein
during a period when the selection unit selects the output of the loop buffer unit, the loop buffer unit stops operations of the address generation unit, the branch prediction unit, the instruction buffer unit, and the first instruction decoding unit.

2. The arithmetic processing device according to claim 1, wherein when loop processing of a loop count equal to or more than a threshold count is executed by an execution unit provided to the arithmetic processing device, the branch prediction unit predicts a next loop processing.

3. The arithmetic processing device according to claim 1, wherein
the branch prediction unit predicts a loop count of the predicted loop processing,
the selection unit, when the predicted loop processing of the predicted loop count is in execution, selects the output of the loop buffer unit, and when the predicted loop processing of the predicted loop count is completed, selects the output of the first instruction decoding unit, and the address generation unit, the branch prediction unit, the instruction buffer unit, and the first instruction decoding unit start operating when the predicted loop processing of the predicted loop count is completed.

4. The arithmetic processing device according to claim 1, wherein the loop buffer unit stores the decoding intermediate results of the instructions of the predicted loop processing that are decoded by the first instruction decoding unit and outputs the stored decoding intermediate results a predetermined number of times, the arithmetic processing device, further comprising:

a second instruction decoding unit configured to decode the decoding intermediate results output by the loop buffer unit.

5. The arithmetic processing device according to claim 1, wherein the loop buffer unit stores decoding results or decoding intermediate results output by the first instruction decoding unit.

6. The arithmetic processing device according to claim 1, wherein the loop buffer unit stores decoding results or decoding intermediate results output by the selection unit.

7. The arithmetic processing device according to claim 1, wherein in the loop buffer unit, a number of parallel outputs per one cycle is larger than a number of parallel inputs per one cycle.

8. The arithmetic processing device according to claim 1, wherein when the predicting of the loop processing by the branch prediction unit fails, the address generation unit, the branch prediction unit, the instruction buffer unit, and the first instruction decoding unit start operating, and the selection unit selects the output of the first instruction decoding unit.

9. The arithmetic processing device according to claim 1, wherein the selection unit selects the output of the loop buffer unit when the loop processing is predicted by the branch prediction unit and the predicting of the loop processing by the branch prediction unit was accurate.

10. A method of controlling an arithmetic processing device, the method comprising:

generating an address for fetching an instruction, the address generated by an address generation unit included in the arithmetic processing device;

predicting a branch destination address of a branch instruction based on the address generated by the address generation unit, outputting the predicted branch destination address to the address generation unit, and predicting loop processing based on the address generated by the address generation unit by a branch prediction unit included in the arithmetic processing device;

storing an instruction corresponding to the address generated by the address generation unit by an instruction buffer unit included in the arithmetic processing device;

decoding the instruction stored by the instruction buffer unit by a first instruction decoding unit included in the arithmetic processing device;

storing, by a loop buffer unit included in the arithmetic processing device, decoding results or decoding intermediate results of instructions of the predicted loop processing that are decoded by the first instruction decoding unit and outputting the stored decoding results or decoding intermediate results a predetermined number of times in response to the predicted loop processing; and selecting either output of the loop buffer unit or output of the first instruction decoding unit by a selection unit included in the arithmetic processing device, wherein during a period when the selection unit selects the output of the loop buffer unit, the loop buffer unit stops operations of the address generation unit, the branch prediction unit, the instruction buffer unit, and the first instruction decoding unit.

* * * * *